United States Patent
Binder et al.

(10) Patent No.: US 11,965,909 B2
(45) Date of Patent: Apr. 23, 2024

(54) FRONT BIAS MAGNETIC SPEED SENSOR WITH TRUE-POWER-ON CAPABILITY

(71) Applicant: Infineon Technologies AG, Neubiberg (DE)

(72) Inventors: Gernot Binder, Klagenfurt (AT); Rocio Elisa De La Torre Rodriguez, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/727,979

(22) Filed: Apr. 25, 2022

(65) Prior Publication Data

US 2023/0341435 A1    Oct. 26, 2023

(51) Int. Cl.
    *G01P 3/487*    (2006.01)
(52) U.S. Cl.
    CPC .................... *G01P 3/487* (2013.01)
(58) Field of Classification Search
    CPC ............... G01D 5/147; G01P 3/487
    See application file for complete search history.

(56) References Cited

FOREIGN PATENT DOCUMENTS

| CN | 205620683 U | * | 10/2016 | |
|----|----|----|----|----|
| JP | 2018072250 | * | 5/2018 | |
| KR | 20060080804 A | * | 7/2006 | ............. F04C 29/00 |

* cited by examiner

*Primary Examiner* — Reena Aurora
(74) *Attorney, Agent, or Firm* — Harrity & Harrity, LLP

(57) ABSTRACT

A magnetic sensor system includes a toothed wheel configured to rotate about a rotation axis that extends in an axial direction, wherein the toothed wheel includes a plurality of teeth and a plurality of notches arranged that define a circumferential perimeter, wherein the toothed wheel further includes an interior cavity arranged within the circumferential perimeter; a front-bias magnet arranged within the interior cavity of the toothed wheel, wherein the front-bias magnet is rotationally fixed and is magnetized with a magnetization direction that extends along a radial axis of the toothed wheel; and a magnetic sensor arranged exterior to the toothed wheel, wherein the magnetic sensor includes a sensor element arranged on the radial axis that coincides with the magnetization direction of the front-bias magnet and the first sensor element is sensitive to a magnetic field of the front-bias magnet that is aligned with the radial axis.

31 Claims, 4 Drawing Sheets

FRONT BIAS MAGNETIC SPEED SENSOR WITH TRUE-POWER-ON CAPABILITY

FIELD

The present disclosure relates generally to sensing a rotational speed of a target object, and, more particularly, to magnetic speed sensors.

BACKGROUND

To measure a rotational speed of a toothed wheel, for example, typically a ferromagnetic toothed wheel is used in combination with a magnetic sensitive sensor and a back-bias magnet mounted to the sensor. The sensor generates output-pulses. A control unit counts the pulses and is able to calculate the rotational speed and actual angle of the rotating wheel, as well as optionally determine the rotation direction of the wheel.

In camshaft sensing applications, a Hall monocell configuration may be used that enables output switching at the tooth edge of a toothed wheel. A z-magnetized back-bias sensor in combination with the Bz-sensitive monocell sensor generates a sinusoidal signal as the ferrous target wheel rotates in front of the sensor. A back-bias magnet produces a static magnetic bias field at the sensing elements, which is deflected and modulated when the tooth wheel rotates. The maximum amplitude is achieved when a tooth center passes the sensor, while the minimum signal is achieved when the sensor faces a notch center of the toothed wheel. Thus, the sensor device switches on the tooth edge.

A benefit in using a Hall monocell sensor is that the sensor is twist-insensitive such that the sensor will work independent from a mounting position regardless of its rotational orientation around its z-axis. Thus, an air-gap between the sensor module and the wheel can be adjusted during mounting using a screw. That is, twisting the sensor module like a screw will adjust the air-gap and the rotational orientation of the sensor can be disregarded. Accordingly, the assembly tolerances are relaxed during mounting of the sensor due to the twist-insensitivity.

On the downside, Hall monocell sensors have a disadvantage in terms of stray-field robustness. Stray-fields are magnetic fields that are introduced by external means located in the proximal environment of the sensor. For example, components located within a vehicle (e.g., for hybrid cars due to current rails driving high electrical currents close to the sensing device or due to inductive battery charging) or a currents flowing through a railway of a train system that generates magnetic fields may cause stray-field disturbance. External magnetic stray-fields directly affect the magnetic signal and in worst case could lead to wrong position information.

In camshaft sensing applications, an engine control unit (ECU) can use the magnetic speed sensors to detect the exact position of the camshaft. This precise information helps to control the fuel injection and the intake and exhaust valves, thereby increasing the overall performance and efficiency of a vehicle and ultimately reduces the emissions. True-power-on (TPO) is a feature that enables a fast start up. Directly at start-up, the magnetic speed sensor can provide the precise position of the camshaft (e.g., information indicating whether the sensor is facing a tooth or a notch of the cam target wheel). Providing this information to the ECU with high accuracy enables advanced control schemes like variable camshaft adjustment (variable valve timing (VVT)) which improves the performance, fuel economy, or emissions of a vehicle by a precise timing of the injection and ignition phase.

Typical camshaft sensors use a "zero-gauss" magnet for the back-bias magnet, which is typically a magnet that has a center axis with a center bore or a center cavity that extends axially along the center axis. The magnet needs to be axially magnetized and a sensing element (e.g., a Hall monocell) is concentrically aligned with the magnet's center axis. As a result of the center bore, the magnet produces essentially a 0 mT magnetic field in the sensor plane at the position of one or more sensing elements. This zero magnetic field in the sensor plane is referred to as a zero magnetic offset and is intended to be present in the absence of a ferromagnetic target. In the case of a toothed wheel, the zero magnetic offset occurs in the sensor plane in the absence of a tooth or, alternatively, in the presence of a notch.

This special magnet is required for the TPO feature. At a notch center of the toothed wheel, the back-bias magnet produces essentially a 0 mT magnetic offset at the Hall plate location. If a tooth passes the sensor, the magnetic offset increases. Therefore, the magnetic signal is an imprint of the mechanical wheel shape (e.g., an imprint of the tooth-notch pattern directly visible in the magnetic signal). The low magnetic offset in the notch center is crucial for a reliable TPO functionality over lifetime. A small magnetic offset (ideally 0 mT) is less affected by temperature drifts and aging effects (e.g., loss of magnetic strength over lifetime). Also independent from mounting tolerances (air-gap variances), the magnetic offset in the notch will be constantly small.

Therefore, with a good magnet design that provides low magnetic offset, one can program a TPO threshold value which is used for the decision whether the sensor is currently facing a tooth or a notch. Thanks to the low magnetic offset aging, temperature effects of the magnet, and mounting tolerances (air-gap variances) of the device will not affect the accuracy of the sensor.

One disadvantage of such a setup is that zero-gauss magnets are expensive. The magnet shape needed to produce a 0 mT magnetic offset in the sensor plane in all sensing directions is rather complex and cannot be produced in high volume by simple mechanical machining processes like slicing, grinding, or drilling. Instead, the magnets need to be manufactured using an expensive mold injection process or a one-by-one single-part sinter tooling process. Due to brittleness of sintered magnets, it is rather challenging to produce the magnets by mechanical process (slicing, drilling, grinding). More expensive, higher-grade materials and more expensive processes are required.

Therefore, an improved magnetic sensing system that is stray-field robust, twist-insensitive (i.e., twist independent), and is less expensive to manufacture may be desirable.

SUMMARY

Magnetic sensor modules, systems and methods are provided, configured to detect a rotation of an object, and, and more particularly, to detect a speed of rotation of an object.

One of more embodiments provide a magnetic sensor system, including: a toothed wheel configured to rotate about a rotation axis that extends in an axial direction, wherein the toothed wheel includes a plurality of teeth and a plurality of notches arranged in an alternating tooth-notch pattern and which define a circumferential perimeter, wherein the toothed wheel further includes an interior cavity arranged within the circumferential perimeter; a front-bias magnet arranged within the interior cavity of the toothed wheel, wherein the front-bias magnet is rotationally fixed and is magnetized with a magnetization direction that extends along a radial axis of the toothed wheel, the radial axis being orthogonal to the rotation axis; and a magnetic sensor arranged exterior to the toothed wheel, wherein the magnetic sensor includes a first sensor element arranged on the radial axis that coincides with the magnetization direction of the front-bias magnet and the first sensor element is sensitive to a magnetic field of the front-bias magnet that is aligned with the radial axis, wherein a rotation of the toothed wheel causes the magnetic field to oscillate between a first extremum value and a second extremum value at a location of the first sensor element.

One of more embodiments provide a magnetic sensor system, including: a toothed wheel configured to rotate about a rotation axis that extends in an axial direction, wherein the toothed wheel includes a plurality of teeth and a plurality of notches arranged in an alternating tooth-notch pattern and which define a circumferential perimeter, wherein the toothed wheel further includes an interior cavity arranged within the circumferential perimeter; a front-bias magnet arranged exterior to the toothed wheel, wherein the front-bias magnet is rotationally fixed and is magnetized with a magnetization direction that extends along a radial axis of the toothed wheel, the radial axis being orthogonal to the rotation axis; and a magnetic sensor arranged within the interior cavity of the toothed wheel, wherein the magnetic sensor includes a first sensor element arranged on the radial axis that coincides with the magnetization direction of the front-bias magnet and the first sensor element is sensitive to a magnetic field of the front-bias magnet that is aligned with the radial axis, wherein a rotation of the toothed wheel causes the magnetic field to oscillate between a first extremum value and a second extremum value at a location of the first sensor element.

One of more embodiments provide a magnetic sensor module, including: a front-bias magnet magnetized with a magnetization direction that extends along a symmetry axis of the front-bias magnet; a magnetic sensor including a first sensor element arranged on an extension of the symmetry axis that coincides with the magnetization direction of the front-bias magnet, wherein the first sensor element is sensitive to a magnetic field of the front-bias magnet that is aligned with the radial axis; and a molded package that encapsulates the front-bias magnet and the magnetic sensor, wherein the molded package includes a package notch formed between the front-bias magnet and the magnetic sensor along the extension of the symmetry axis, wherein the package notch is formed to enable a plurality of teeth of a toothed wheel to pass through the package notch during a rotation of the toothed wheel.

BRIEF DESCRIPTION OF THE DRAWINGS

Embodiments are described herein making reference to the appended drawings.

DETAILED DESCRIPTION

Figure 1A:
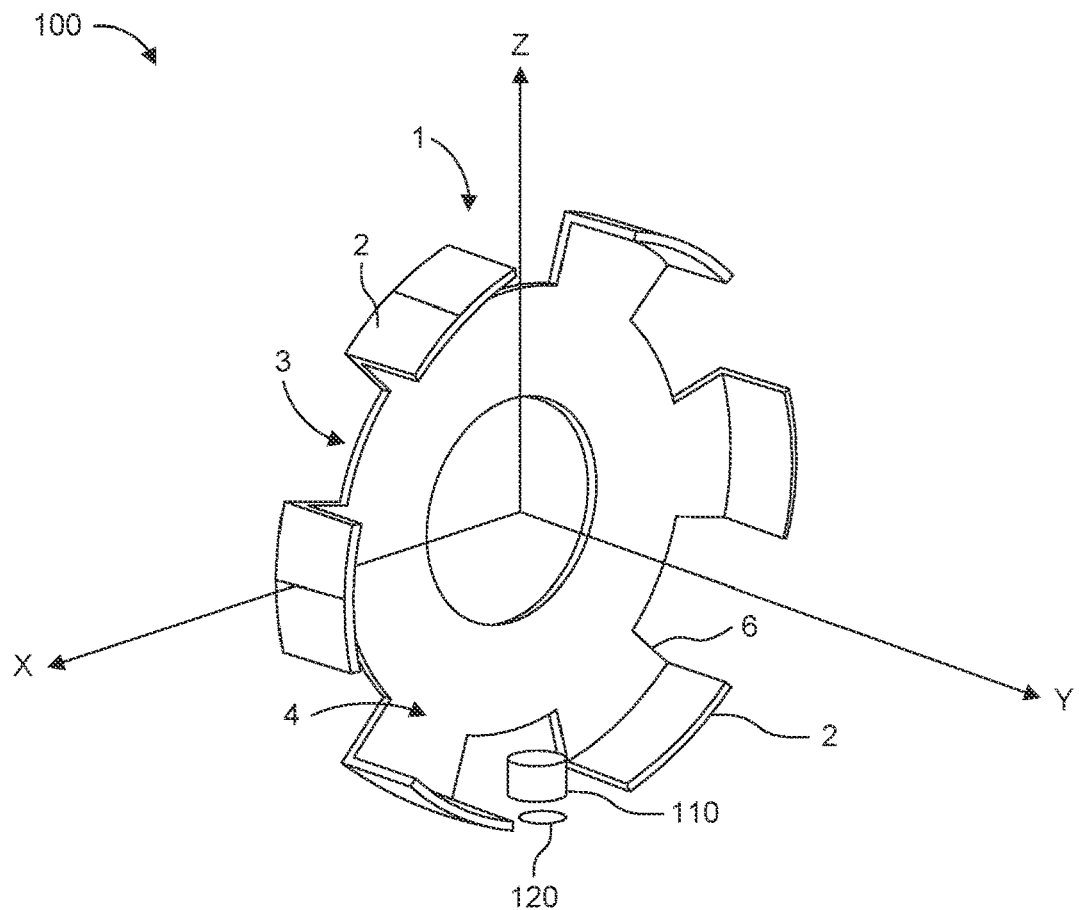
FIGS. 1A and 1B illustrate a magnetic field sensing principle of a magnetic sensor system according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise. It is also to be understood that other embodiments may be utilized and structural or logical changes may be made without departing from the scope defined by the claims. The following detailed description, therefore, is not to be taken in a limiting sense.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Directional terminology, such as "top", "bottom", "above", "below", "front", "back", "behind", "leading", "trailing", "over", "under", etc., may be used with reference to the orientation of the figures and/or elements being described. Because the embodiments can be positioned in a number of different orientations, the directional terminology is used for purposes of illustration and is in no way limiting. In some instances, directional terminology may be exchanged with equivalent directional terminology based on the orientation of an embodiment so long as the general directional relationships between elements, and the general purpose thereof, is maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Depending on certain implementation requirements, a storage medium may include a RAM, a ROM, a PROM, an EPROM, an EEPROM, a FLASH memory, or any other medium having electronically readable control signals stored thereon, which cooperate (or are capable of cooperating) with a programmable computer system such that the respective method is performed. Therefore, a storage medium may be regarded as a non-transitory storage medium that is computer readable.

Additionally, instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. A "controller," including one or more processors, may use electrical signals and digital algorithms to perform its receptive, analytic, and control functions, which may further include corrective functions.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field, an electric field, a pressure, a force, a current or a voltage, but is not limited thereto. A sensor device, as described herein, may be a speed sensor that measures a rotational speed of an object, such as a toothed wheel.

A magnetic field sensor, for example, includes one or more magnetic field sensor elements that measure one or more characteristics of a magnetic field (e.g., an amount of magnetic field flux density, a field strength, a field angle, a field direction, a field orientation, etc.). The magnetic field may be produced by a magnet, a current-carrying conductor (e.g., a wire), the Earth, or other magnetic field source. Each magnetic field sensor element is configured to generate a sensor signal (e.g., a voltage signal) in response to one or more magnetic fields impinging on the sensor element. Thus, a sensor signal is indicative of the magnitude and/or the orientation of the magnetic field impinging on the sensor element.

According to one or more embodiments, a magnetic field sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with a back-bias magnet to form a sensor module, sensor device, or the like.

One or more magnetic field sensor elements, or for short a magnetic field sensors, included in the sensor package is thus exposed to the magnetic field, and the sensor signal (e.g., a voltage signal) provided by each magnetic field sensor element is proportional to the magnitude of the magnetic field, for example. Further, it will be appreciated that the terms "sensor" and "sensing element" may be used interchangeably throughout this description, and the terms "sensor signal" and "measurement value" may be used interchangeably throughout this description.

The sensor circuit may be referred to as a signal processing circuit and/or a signal conditioning circuit that receives the signal (i.e., sensor signal) from the magnetic field sensor element in the form of raw measurement data and derives, from the sensor signal, a measurement signal that represents the magnetic field. The sensor circuit may include a digital converter (ADC) that converts the analog signal from the one or more sensor elements to a digital signal. The sensor circuit may also include a digital signal processor (DSP) that performs some processing on the digital signal, to be discussed below. Therefore, the sensor package comprises a circuit which conditions and amplifies the small signal of the magnetic field sensor via signal processing and/or conditioning.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

Magnetic field sensor elements include, but is not limited to, lateral Hall effect devices, vertical Hall effect devices, or magneto-resistive sensors, often referred to as XMR sensors which is a collective term for anisotropic magneto-resistive (AMR), giant magneto-resistive (GMR), tunneling magneto-resistive (TMR), etc.

Magnetoresistive sensor elements of such xMR sensors typically include a plurality of layers, of which at least one layer is a reference layer with a reference magnetization (i.e., a reference direction). The reference magnetization provides a sensing direction corresponding to a sensing axis of the xMR sensor, thereby making the sensor element to a magnetic field component aligned in the sensing direction. A magnetic field component may be, for example, an x-magnetic field component ($B_x$), a y-magnetic field component (By), or a z-magnetic field component (Bz), where the Bx and By field components are in-plane to the chip, and Bz is out-of-plane to the chip in the examples provided. Accordingly, if a magnetic field component points exactly in the same direction as the reference direction, a resistance of the xMR sensor element is at a maximum, and, if a magnetic field component points exactly in the opposite direction as the reference direction, the resistance of the xMR sensor element is at a minimum.

In some applications, an xMR sensor includes a plurality of magnetoresistive sensor elements, which have the same or different reference magnetizations. Examples of such applications, in which various reference magnetizations are used, are angle sensors, compass sensors, or specific types of speed sensors (e.g., speed sensors in a bridge arrangement referred to as monocells).

By way of example, such magnetoresistive sensor elements are used in speed, angle, or rotational speed measuring apparatuses, in which magnets may be moved relative to an magnetoresistive sensor elements and hence the magnetic field at the location of the magnetoresistive sensor element changes in the case of movement, which, in turn, leads to a measurable change in resistance. For the purposes of an angle sensor, a magnet or a magnet arrangement may be applied to a rotatable shaft and an xMR sensor may be arranged stationary in relation thereto.

A Hall effect sensor is a transducer that varies its output voltage (Hall voltage) in response to a magnetic field. It is based on the Hall effect which makes use of the Lorentz force. The Lorentz force deflects moving charges in the presence of a magnetic field which is perpendicular to the current flow through the sensor or Hall plate. Thereby, a Hall plate can be a thin piece of semiconductor or metal. The deflection causes a charge separation which causes a Hall electrical field. This electrical field acts on the charge in the opposite direction with regard to the Lorentz Force. Both forces balance each other and create a potential difference perpendicular to the direction of current flow. The potential difference can be measured as a Hall voltage and varies in a linear relationship with the magnetic field for small values. Hall effect sensors can be used for proximity switching, positioning, speed detection, and current sensing applications.

A vertical Hall sensor is a magnetic field sensor constructed with the Hall element perpendicular to the plane of the sensor chip (e.g., extending from a main surface of the chip into the chip body). It senses magnetic fields perpendicular to its defined sensitive edge (top, right, or left, relative to the main surface of the chip). This generally means that a vertical Hall sensor is sensitive to a magnetic field component that extends parallel to their surface and parallel, or in-plane, to the main surface of the chip in which the vertical Hall sensor is integrated. In particular, a vertical Hall sensor may extend from the main surface vertically into the chip (e.g., into a semiconductor substrate). The plane of sensitivity may be referred to herein as a "sensitivity-axis" or "sensing axis" and each sensing axis has a reference direction. For vertical Hall sensor elements, voltage values output by the sensor elements change according to the magnetic field strength in the direction of its sensing axis. For the purposes of this disclosure, a main surface of the sensor chip is defined in the XY plane and a vertical Hall sensor is sensitive to a field in the XY plane (e.g., in the X direction, Y direction, or a direction therebetween).

On the other hand, a lateral (planar) Hall sensor is constructed with the Hall element in the same plane as the main surface of the sensor chip. It senses magnetic fields perpendicular to its planar surface. This means they are sensitive to magnetic fields vertical, or out-of-plane, to the main surface of the chip. The plane of sensitivity may be referred to herein as a "sensitivity-axis" or "sensing axis" and each sensing axis has a reference direction. Similar to vertical Hall sensor elements, voltage values output by lateral Hall sensor elements change according to the magnetic field strength in the direction of its sensing axis. For the purposes of this disclosure, a main surface of the sensor chip is defined in the XY plane and a lateral Hall sensor is sensitive to a field aligned in a Z direction that is perpendicular to the XY plane.

Figure 1B:
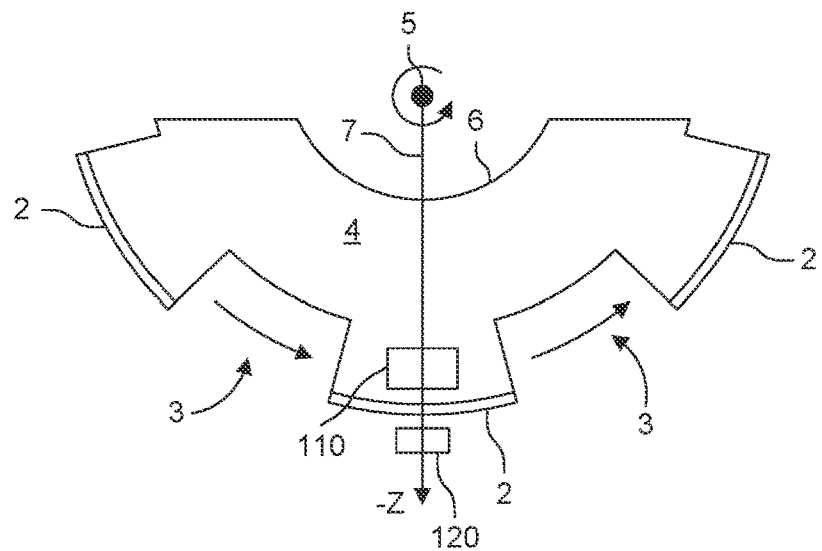

FIGS. 1A and 1B illustrate a magnetic field sensing principle of a magnetic sensor system 100 according to one or more embodiments. The magnetic sensor system 100 includes a toothed wheel 1 that has alternating teeth 2 and notches 3. The teeth 2 and notches 3 are arranged in an alternating tooth-notch pattern and define a circumferential perimeter of the toothed wheel 1. The toothed wheel 1 also includes an interior cavity 4 that is arranged within and is defined by the circumferential perimeter. In some instances, the toothed wheel 1 may be a stamped wheel manufactured by a mechanical press that is used to form the interior cavity 4 and the "L shape" of the teeth.

The toothed wheel 1 is configured to rotate about a rotation axis 5 that extends in an axial direction. In this example, the axial direction is defined by a y-axis and the teeth 2 and notches 3 are located away from the rotation axis 5 in different radial directions that are orthogonal to the rotation axis. The x-axis and z-axis are examples of two radial directions that are orthogonal to the rotation axis. The toothed wheel 1 further includes a support structure 6, such as a wheel disc, that extends radially between the rotation axis 5 and the plurality of teeth 2, wherein each of the plurality of teeth 2 extends from the support structure 5 in the axial direction to define the circumferential perimeter. In other words, the teeth 2 protrude from the support structure 5 in the y-direction, parallel to the rotation axis in the illustrated example. The interior cavity 4 is formed in the area inside the teeth protrusions and can be said to extend between two teeth that are arranged on opposite sides of the wheel diameter.

The magnetic sensor system 100 further includes a front-bias magnet 110 arranged within the interior cavity 4 of the toothed wheel 1. The front-bias magnet 110 is rotationally fixed in that it does not rotate with the toothed wheel 1 but remains in a fixed position relative to the toothed wheel 1. The front-bias magnet 110 is magnetized with a magnetization direction that extends along a radial axis 7 of the toothed wheel 1, the radial axis 7 being orthogonal to the rotation axis 5. In this case, z-axis represents the radial axis 7 and the magnetization direction extends in the +z-direction or −z-direction of the z-axis. IN other words, the magnetization direction can point in the negative direction or in the positive direction of the radial axis 7.

The front-bias magnet 110 can be a diametrically magnetized magnet or an axially magnetized magnet, as long as its magnetization direction extends along a defined radial axis 7 of the toothed wheel 1. In addition, the front-bias magnet 110 need not be a zero-gauss magnet that requires a bore that extends through its symmetry axis, such as a ring magnet or a bored cylinder magnet. Instead, the front-bias magnet 110 can be a simple block magnet, disc magnet, or cylinder magnet that is of an entirely solid construction (i.e., with no bore present). For example, the front-bias magnet 110 can be a block magnet, an axially magnetized cylinder magnet, or a diametrically magnetized disc magnet. The radial axis 7 (e.g., z-axis) that coincides with the magnetization direction of the front-bias magnet 110 extends through an axis of symmetry of the front-bias magnet 110.

The magnetic sensor system 100 further includes a magnetic sensor 120 arranged exterior to the toothed wheel 1. Like the front-bias magnet 110, the magnetic sensor 120 is rotationally fixed in that it does not rotate with the toothed wheel 1 but remains in a fixed position relative to the toothed wheel 1. This means that the magnetic sensor 120 also remains in a fixed position relative to the front-bias magnet 110. The magnetic sensor 120 includes at least one sensor element arranged on the radial axis 7 (e.g., z-axis), or an extension thereof, that coincides with the magnetization direction of the front-bias magnet 110. If more than one sensor element is present, each sensor element is arranged on the radial axis 7 (e.g., z-axis), or an extension thereof, that coincides with the magnetization direction of the front-bias magnet 110.

Furthermore, each sensor element is sensitive to a magnetic field of the front-bias magnet 110 that is aligned with the radial axis 7 (e.g., z-axis). That is, each sensor element has its sensitivity-axis aligned with this radial axis 7 for sensing a magnetic field component of the magnetic field that coincides with the magnetization direction of the front-bias magnet 110. In this example, each sensor element has a sensitivity-axis aligned with the positive z-direction for measuring the magnetic field component Bz or has its sensitivity-axis aligned with the negative z-direction for measuring the magnetic field component −Bz. In the case of multiple sensor elements, the sensitivity-axes of the sensor elements all point in the same direction.

In the case that xMR sensor elements, the resistance values of the xMR sensor elements change depending on the magnetic field strength in the direction of the sensitivity-axis, and the resistance values of the xMR sensor elements may be detected by a sensor circuit of the magnetic sensor 120 or may be output from the senor element as a voltage value that is representative of the resistance value (i.e., the voltage value changes as the resistance value changes). In the former case, the resistance value is output as a sensor signal, and, in the latter case, the voltage value is output as a sensor signal, however, the sensor signal is not limited thereto.

Alternatively, the sensor elements may be vertical or lateral Hall sensor elements that have a sensitivity-axis that is aligned with the magnetic field component that coincides with the magnetization direction of the front-bias magnet 110 (i.e., that coincides with the radial axis 7). In Hall sensor elements, voltage values output by the sensor elements change according to the magnetic field strength in the direction of the sensitivity-axis.

The magnetic sensor system 100 is configured such that tooth of the toothed wheel 1 shields the magnetic sensor 120 from the magnetic field produced by the front-bias magnet 110 such that substantially no magnetic field is detected at the sensor elements of the magnetic sensor 120 and each notch the toothed wheel 1 exposes the magnetic sensor 120 to the magnetic field produced by the front-bias magnet 110 such that a certain magnetic field strength is detectable at the sensor elements of the magnetic sensor 120. The certain magnetic field strength depends, in part, on the air-gap or distance between the front-bias magnet 110 and the magnetic sensor 120. The smaller the air-gap or distance, the greater the magnetic field strength. Naturally, the magnetic field strength also depends on how strongly the magnet is magnetized, the material of the magnet, etc.

The certain magnetic field strength may be detected as a positive value or a negative value depending on whether the magnetization direction and the sensitivity-axes point in the negative direction (i.e., the −z-direction) or the positive direction of the radial axis 7, and more particularly, whether the sensitivity-axes are pointing parallel or anti-parallel to the magnetization direction. In either case, the absolute value of the magnetic field strength present at the sensor elements when a center of a notch passes between the front-bias magnet 110 and the magnetic sensor 120 is much greater than the absolute value of the magnetic field strength present at the sensor elements when a center of a tooth passes between the front-bias magnet 110 and the magnetic sensor 120. In particular, a zero or a substantially zero (e.g., ~0 mT) magnetic offset is present at the sensor elements of the magnetic sensor 120 each time a center of a tooth passes between the front-bias magnet 110 and the magnetic sensor 120 as a result of the magnetic shielding provided by the teeth 2. Thus, substantially no magnetic field is detected at the sensor elements of the magnetic sensor 120 when a center of a tooth passes between the front-bias magnet 110 and the sensor elements.

Accordingly, as the toothed wheel 1 rotates about its rotation axis 5, the teeth 2 and the notches 3 alternate passed the space between the front-bias magnet 110 and the magnetic sensor 120. This rotation of the toothed wheel 1 causes the magnetic field to oscillate between a first extremum value (e.g., certain positive or negative magnetic field strength) and a second extremum value (e.g., 0 mT) at a location of a sensor element. This, in turn, causes a sensor signal generated by a sensor element to oscillate between two extrema values proportional to the sensed magnetic field strength.

For example, a sensor element is configured to generate a sensor signal in response to sensing the oscillating magnetic field modulated by the rotation of the toothed wheel 1, and the sensor signal has a signal pattern representative of the tooth-notch pattern of the toothed wheel 1. In particular, the sensor signal may have a first signal value representative of the first extremum value of the magnetic field when a center of any notch is interposed between the front-bias magnet 110 and the sensor element, and the sensor signal has a second signal value representative of the second extremum value of the magnetic field when a center of any tooth is interposed between the front-bias magnet 110 and the sensor element. Due to the shielding effect of the teeth 2, the second extremum value of the magnetic field is substantially zero and an absolute value of the first extremum value is greater than an absolute value of the second extremum value.

Figure 2:
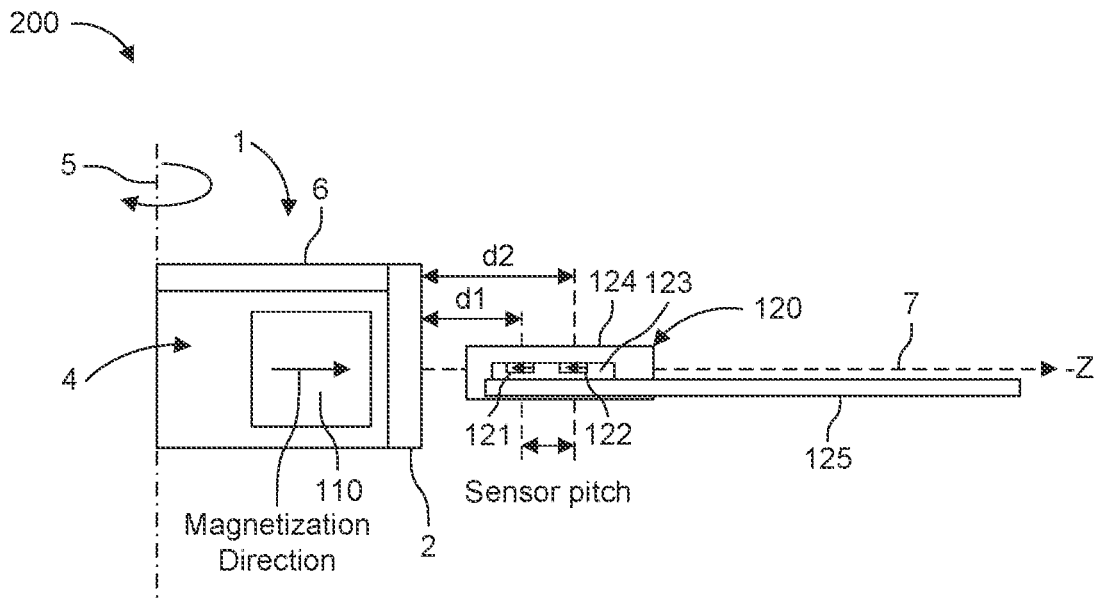
FIG. 2 illustrates a cross-sectional view of a magnetic sensor system according to one or more embodiments.

FIG. 2 illustrates a cross-sectional view of a magnetic sensor system 200 according to one or more embodiments. The magnetic sensor system 200 applies the magnetic field sensing principle described in conjunction with FIGS. 1A and 1B. In this example, the front-bias magnet 110 is arranged inside the interior cavity 4 of the toothed wheel 1 and the magnetic sensor 120 is arranged outside of the toothed wheel 1 such that the teeth 2 of the toothed wheel 1 pass between the front-bias magnet 110 and the magnetic sensor 120 as the toothed wheel 1 rotates about its rotation axis 5. However, it will be appreciated that this arrangement could be reversed while still achieving the same result. In other words, the magnetic sensor 120 could be arranged inside the interior cavity 4 of the toothed wheel 1 and the front-bias magnet 110 could be arranged outside of the toothed wheel 1. In this setup, the teeth 2 still shield the magnetic sensor 120 from the magnetic field.

The magnetic sensor 120 includes a first sensor element 121 that has its sensitivity-axis aligned with the radial axis 7 and pointing in the positive z-direction. The radial axis 7 extends through both the first sensor element 121 and the axis of symmetry of the front-bias magnet 110, in alignment with (i.e., coincides with) the magnetization direction of the front-bias magnet 110. The first sensor element 121 is arranged at a first distance d1 from the tooth 2 along the radial axis 7 and thus has a specific distance from the front-bias magnet 110. The magnetic sensor 120 may also include an optional second sensor element 122 that has its sensitivity-axis aligned with the radial axis 7 and pointing in the positive z-direction. The radial axis 7 extends through both the second sensor element 122 and the axis of symmetry of the front-bias magnet 110, in alignment with (i.e., coincides with) the magnetization direction of the front-bias magnet 110. The second sensor element 122 is arranged at a second distance d2 from the tooth 2 along the radial axis 7 and thus has a specific distance from the front-bias magnet 110. The two sensor elements 121 and 122 are also spaced apart from each other along the radial axis 7 by a distance referred to as a sensor pitch.

While the magnetic field will be substantially zero when a center of a tooth passes between the front-bias magnet 110 and the magnetic sensor 120, the magnetic field at the two sensor elements 121 and 122 will be different when a center of a notch passes between the front-bias magnet 110 and the magnetic sensor 120 due to the difference in distances between d1 and d2 along the radial axis. For example, the magnetic field strength at sensor element 121 will be greater than the magnetic field strength at sensor element 121 due to the different distances.

The inclusion of two sensor elements 121 and 122 provides a differential sensing principle that allows external magnetic stray-fields to be canceled out by differential calculus. For example, external stray-fields in the sensor plane (e.g., aligned along the z-axis) will cancel out due to the differential calculus applied to the two sensor signals and out-of-plane magnetic field components do not affect the sensor output because the sensor elements 121 and 122 are not sensitive thereto. The sensor circuit may be configured to combine the two sensor signals to generate a differential signal that is independent of external stray-fields. For example, the sensor signal generated by one of the sensor elements may be subtracted from the other sensor signal to obtain the differential signal.

It will be appreciated that the differential measurement principle could be also realized by sensor elements arranged in a Wheatstone bridge configuration, where the output of the Wheatstone bridge is a differential signal. For example, four xMR sensor elements may be connected in a Wheatstone bridge, with one sensor element located in a different segment or branch of the Wheatstone bridge. Respective pairs of xMR sensor elements of the Wheatstone bridge are located at essentially the same distance (two xMR sensor elements at distance d1 close to the magnet and the other two xMR sensor elements at the distance d2). The differential bridge output voltage will cancel homogeneous stray-fields. Thus, this differential bridge output voltage may be used as the differential signal.

In addition, the sensing capabilities of the magnetic sensor 120 is independent of the air-gap between the magnetic sensor 120 and the tooth wheel 1 or the front-bias magnet 110. That is, the magnetic sensor 120 is tolerant to manufacturing and assembly errors during which the exact air-gap between the magnetic sensor 120 and the tooth wheel 1 may differ. Small differences in this air-gap along the radial axis 7 that may occur during assembly does not negatively impact the ability of the magnetic sensor 120 to detect wheel speed or its ability to discriminate the presence of a notch or a tooth between the magnetic sensor 120 and the tooth wheel 1 or the front-bias magnet 110. The sensor elements 121 and 122 are twist-insensitive such that the sensor will work independent from a mounting position regardless of its rotational orientation around the z-axis.

In this example, the two sensor elements 121 and 122 may be xMR sensor elements or vertical Hall sensor elements, both technologies allow the sensitivity-axes to be aligned with the magnetization direction in this setup. The two sensor elements 121 and 122 may be integrated in a sensor chip 123 of the magnetic sensor 120 that is encapsulated by a sensor package 124 (e.g., molding). As will be discussed below, the sensor chip 123 may include a sensor circuit that receives and processes the sensor signals generated by the sensor elements 121 and 122. The magnetic sensor 120 may also include a chip carrier or lead 125 that electrically connects the sensor circuit to an external device, such as an external controller, which may be an electronic control unit (ECU).

The rotation of the toothed wheel causes the magnetic field to oscillate between a first extremum value and a second extremum value at a location of the first sensor element 121 and causes the magnetic field to oscillate between a third extremum value and a fourth extremum value at a location of the second sensor element 122. The second and the fourth extremum values of the magnetic field are substantially zero due the shielding effect of the teeth 2 that produces a zero magnetic offset at the sensor elements. The first and the third extremum values of the magnetic field are different due to the difference between distances d1 and d2.

As a result, the first sensor element 121 is configured to generate a first sensor signal in response to sensing the oscillating magnetic field modulated by the rotation of the toothed wheel 1 and the second sensor element 121 is configured to generate a second sensor signal in response to sensing the oscillating magnetic field modulated by the rotation of the toothed wheel 1.

The first sensor signal has a first extremum signal value representative of the first extremum value of the magnetic field when a center of any notch is interposed between the front-bias magnet 110 and the first sensor element 121. The first extremum signal value may be a positive (maximum) value or a negative (minimum) value depending on whether the sensitivity-axis of sensor element 121 is parallel or anti-parallel to the magnetization direction. The first sensor signal has a second extremum signal value representative of the second extremum value of the magnetic field when a center of any tooth is interposed between the front-bias magnet and the first sensor element. The second extremum signal value may be zero or substantially zero, corresponding to the substantially zero magnetic offset.

The second sensor signal has a third extremum signal value representative of the third extremum value of the magnetic field when a center of any notch is interposed between the front-bias magnet and the second sensor element. The third extremum signal value may be a positive (maximum) value or a negative (minimum) value depending on whether the sensitivity-axis of sensor element 122 is parallel or anti-parallel to the magnetization direction. The second sensor signal has a fourth extremum signal value representative of the fourth extremum value of the magnetic field when a center of any tooth is interposed between the front-bias magnet 110 and the second sensor element 122.

The fourth extremum signal value may be zero or substantially zero, corresponding to the substantially zero magnetic offset.

The sensor circuit of the magnetic sensor 120 may be configured to receive the first sensor signal and the second sensor signal, generate a differential signal based on a combination of the first sensor signal and the second sensor signal, and generate a pulsed output signal based on the differential sensor signal crossing at least one threshold. For example, the sensor circuit may compare the differential signal to a predetermined switching threshold (e.g., a middle value between two expected extrema values of the differential signal) and generate a signal pulse each time the differential signal crosses the switching threshold. Alternatively, a signal pulse may be generated only on a rising or on a falling transition of the differential signal. In any case, the frequency of the pulses corresponds to a speed of rotation of the wheel, which further corresponds to a speed of rotation of a drive shaft (e.g., camshaft) that drives the rotation of the wheel.

In addition, the sensor circuit may be configured to determine whether a notch or a tooth is located between the front-bias magnet 110 and the magnetic sensor 120 based on at least one of the first sensor signal, the second sensor signal, or the differential signal. For example, the sensor circuit may compare one of the first sensor signal, the second sensor signal, or the differential signal to a predetermined threshold. If the signal is on the side of the threshold closer to zero, the sensor circuit may determine that a tooth is located between the front-bias magnet 110 and the magnetic sensor 120. If the signal is substantially zero, the sensor circuit may determine that a center of a tooth is located between the front-bias magnet 110 and the magnetic sensor 120. In contrast, if the signal is on the side of the threshold closer to a maximum positive value or minimum negative value, the sensor circuit may determine that a notch is located between the front-bias magnet 110 and the magnetic sensor 120. If the signal is substantially at the maximum positive value or the minimum negative value, the sensor circuit may determine that a center of a notch is located between the front-bias magnet 110 and the magnetic sensor 120.

Figure 3:
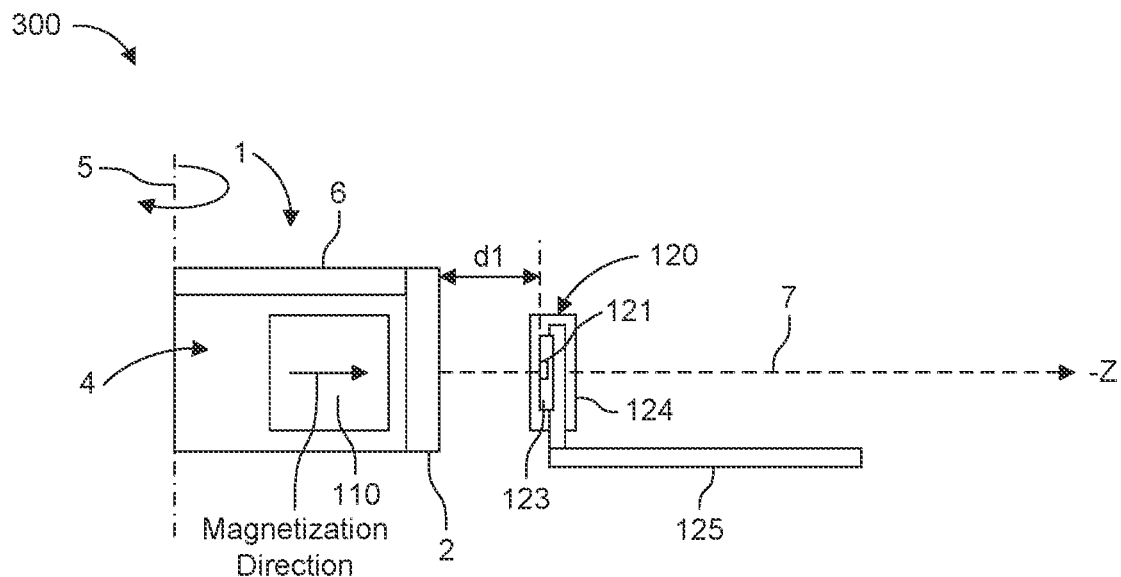
FIG. 3 illustrates a cross-sectional view of a magnetic sensor system according to one or more embodiments.

FIG. 3 illustrates a cross-sectional view of a magnetic sensor system 300 according to one or more embodiments. The magnetic sensor system 300 applies the magnetic field sensing principle described in conjunction with FIGS. 1A and 1B and includes features that are similar to magnetic sensor system 200. It will be appreciated that this arrangement could be reversed such that the magnetic sensor 120 is arranged inside the interior cavity 4 of the toothed wheel 1 and the front-bias magnet 110 is arranged outside of the toothed wheel 1.

The magnetic sensor 120 is a monocell configuration that includes only one sensor element, the first sensor element 121, that has its sensitivity-axis aligned with the radial axis 7. In this example, the sensor element 121 may be a lateral Hall sensor element or a z-sensitive xMR sensor element, both technologies allow the sensitivity-axes to be aligned with the magnetization direction in this setup. The sensor element 121 is twist-insensitive such that the sensor will work independent from a mounting position regardless of its rotational orientation around its z-axis.

The sensor circuit of the magnetic sensor 120 may be configured to receive the first sensor signal and generate a pulsed output signal based on the first sensor signal crossing at least one threshold. For example, the sensor circuit may compare the first sensor signal to a predetermined switching threshold (e.g., an intermediate value between two expected extrema values of the differential signal) and generate a signal pulse each time the first sensor signal crosses the switching threshold. Alternatively, a signal pulse may be generated only on a rising or on a falling transition of the first sensor signal. In any case, the frequency of the pulses corresponds to a speed of rotation of the wheel, which further corresponds to a speed of rotation of a drive shaft (e.g., camshaft) that drives the rotation of the wheel.

In addition, the sensor circuit may be configured to determine whether a notch or a tooth is located between the front-bias magnet 110 and the magnetic sensor 120 based on the first sensor signal. For example, the sensor circuit may compare the first sensor signal to a predetermined threshold. If the first sensor signal is on the side of the threshold closer to zero, the sensor circuit may determine that a tooth is located between the front-bias magnet 110 and the magnetic sensor 120. If the first sensor signal is substantially zero, the sensor circuit may determine that a center of a tooth is located between the front-bias magnet 110 and the magnetic sensor 120. In contrast, if the first sensor signal is on the side of the threshold closer to a maximum positive value or minimum negative value, the sensor circuit may determine that a notch is located between the front-bias magnet 110 and the magnetic sensor 120. If the first sensor signal is substantially at the maximum positive value or the minimum negative value, the sensor circuit may determine that a center of a notch is located between the front-bias magnet 110 and the magnetic sensor 120.

Figure 4:
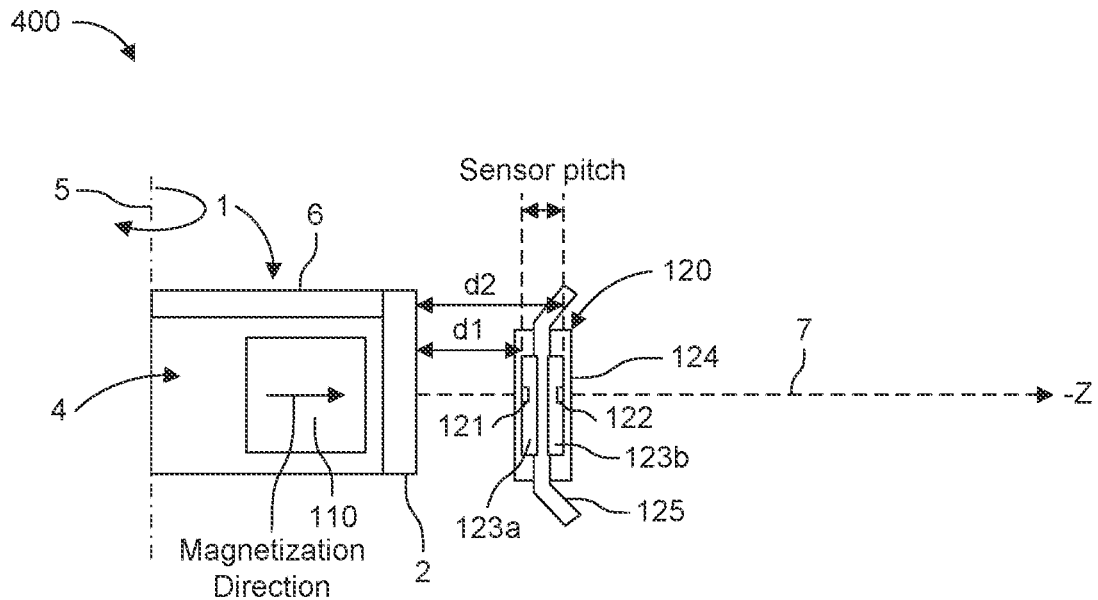
FIG. 4 illustrates a cross-sectional view of a magnetic sensor system according to one or more embodiments.

FIG. 4 illustrates a cross-sectional view of a magnetic sensor system 400 according to one or more embodiments. The magnetic sensor system 400 applies the magnetic field sensing principle described in conjunction with FIGS. 1A and 1B and includes features that are similar to magnetic sensor system 200. It will be appreciated that this arrangement could be reversed such that the magnetic sensor 120 is arranged inside the interior cavity 4 of the toothed wheel 1 and the front-bias magnet 110 is arranged outside of the toothed wheel 1.

The magnetic sensor 120 has a differential sensing configuration that includes both the first sensor element 121 and the second sensor element 122. As in FIG. 2, the first sensor element 121 and the second sensor element 122 have their sensitivity-axes aligned with the radial axis 7. In this example, the sensor elements 121 and 122 may be a lateral Hall sensor element or a z-sensitive xMR sensor element, both technologies allow the sensitivity-axes to be aligned with the magnetization direction in this setup. In addition, the magnetic sensor 120 includes two sensor chips 123a and 123b arranged on opposite sides of the chip carrier or lead 125 so that the sensor elements 121 and 122 can be arranged at different distances d1 and d2 from the toothed wheel 1 (and from the front-bias magnet 110).

The two chips 123a and 123b may include a common sensor circuit (e.g., a common processor) that receives and processes the sensor signals generated by the sensor elements 121 and 122, for example, to generate a differential signal. That is, one of the chips may process both sensor signals to, for example, generate the differential signal, calculate the wheel speed, the detect the present of a tooth or a notch for True-power-on (TPO). The two chips 123a and 123b may electrically connected via the chip carrier or lead 125. Alternatively, the two sensor signals may be output to an external controller for processing.

As a result of this setup, the magnetic sensor 120 is both twist-insensitive such that the sensor will work independent from a mounting position regardless of its rotational orientation around its z-axis and is robust against external magnetic stray-fields due to the differential sensing principle.

The sensor circuit of the magnetic sensor 120 may be configured to receive the first sensor signal and the second sensor signal, generate a differential signal based on a combination of the first sensor signal and the second sensor signal, and generate a pulsed output signal based on the differential sensor signal crossing at least one threshold. In addition, the sensor circuit may be configured to determine whether a notch or a tooth is located between the front-bias magnet 110 and the magnetic sensor 120 based on at least one of the first sensor signal, the second sensor signal, or the differential signal.

Figure 5A:
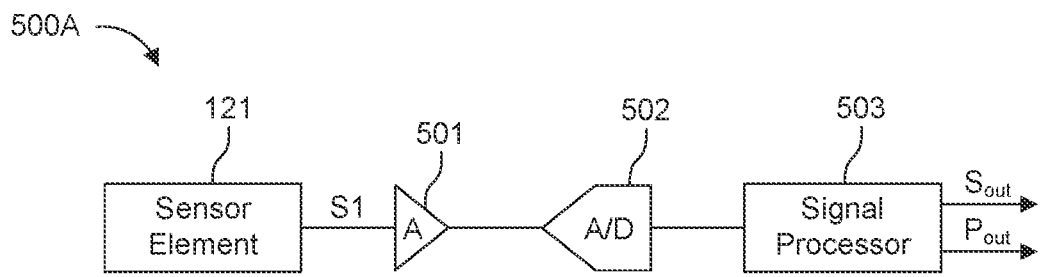
FIG. 5A is a schematic block diagram of a sensor circuit for a monocell sensing configuration according to one or more embodiments.
Figure 5B:
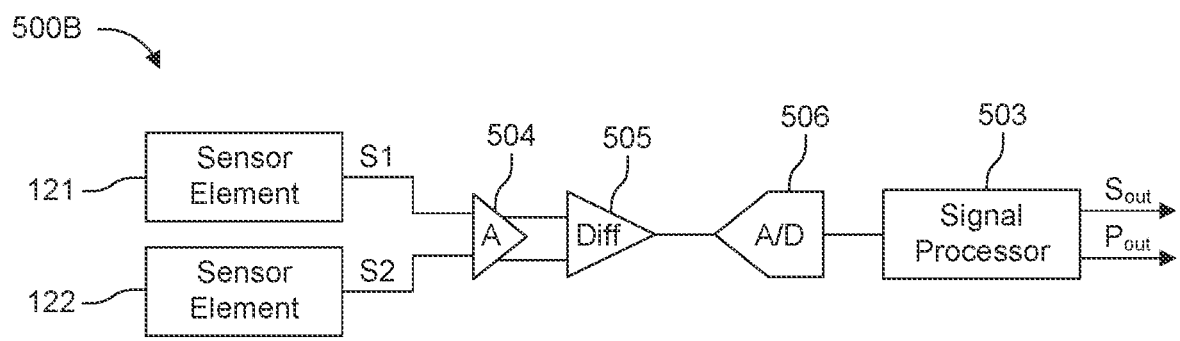
FIG. 5B is a schematic block diagram of a sensor circuit for a differential sensing configuration according to one or more embodiments.

FIG. 5A is a schematic block diagram of a sensor circuit 500A for a monocell sensing configuration according to one or more embodiments. FIG. 5B is a schematic block diagram of a sensor circuit 500B for a differential sensing configuration according to one or more embodiments.

Sensor circuit 500A includes sensor element 121 that generates a sensor signal S1 as an analog signal (e.g., an analog voltage), an optional amplifier 501 that amplifies sensor signal S1, and ADC 502 that converts the amplified signal into a digital sensor signal, and a signal processor 503 that processes the digital sensor signal. For example, the signal processor 503 may compare the digital sensor signal to one or more switching thresholds for generating a pulsed output signal Sout, the pulses of which are representative of the wheel speed of the tooth wheel 1. The signal processor 503 may include a current modulator, also referred to as a protocol generator, that receives the output of a comparator and generates the pulsed output signal Sout as an output current according to a programmed current switching protocol or rule set.

Additionally, the signal processor 503 may compare the digital sensor signal to one or more position thresholds or compare the value of the digital sensor signal to values listed in a look-up table for generating a position output signal Pout. In particular, the signal processor 503 may use the one or more position thresholds for determining the position of the toothed wheel 1, including whether a tooth or a notch is presently between the front-bias magnet 110 and the magnetic sensor 120. In this way, the signal processor 503 determines whether a notch or a tooth is located between the front-bias magnet and the magnetic sensor based on the sensor signal. Thus, the position output signal Pout may indicate whether a tooth or a notch is presently between the front-bias magnet 110 and the magnetic sensor 120, which may be used for TPO.

Sensor circuit 500B includes the first sensor element 121 that generates a sensor signal S1 as an analog signal (e.g., an analog voltage) and the second sensor element 122 that generates a sensor signal S2 as an analog signal (e.g., an analog voltage). The sensor circuit 500B additionally includes an optional amplifier 504, a differential comparator 505, an ADC 506, and the signal processor 503. The amplifier 504 amplifies the differential sensor signals S1 and S2 according to a set gain and provides the amplified differential sensor signals to the differential comparator 505. The differential comparator 505 converts the differential sensor signals to an analog differential measurement signal having a value equal to the voltage difference between the amplified differential sensor signals. The ADC 506 converts the analog differential measurement signal into the digital domain, specifically, into a digital differential measurement signal representative of the voltage difference between sensor signals S1 and S2. The signal processor 503 processes the digital differential measurement signal in a similar manner described above in reference to sensor circuit 500A to generate a pulsed output signal Sout and a position output signal Pout.

Figure 6A:
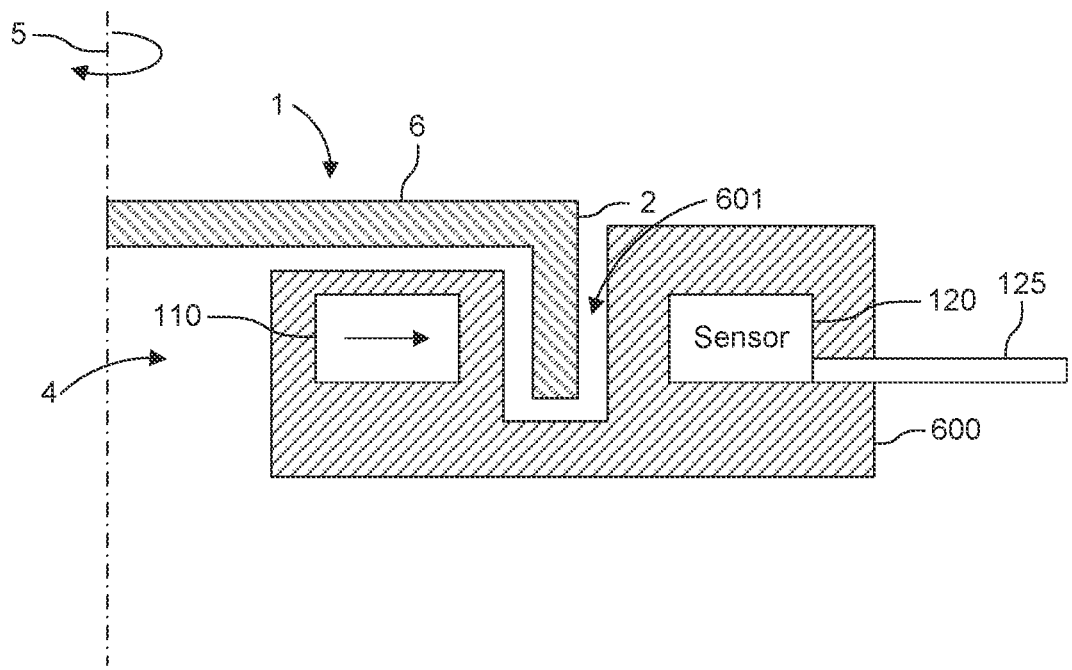
FIGS. 6A and 6B illustrate sensor packages according to one or more embodiments.
Figure 6B:
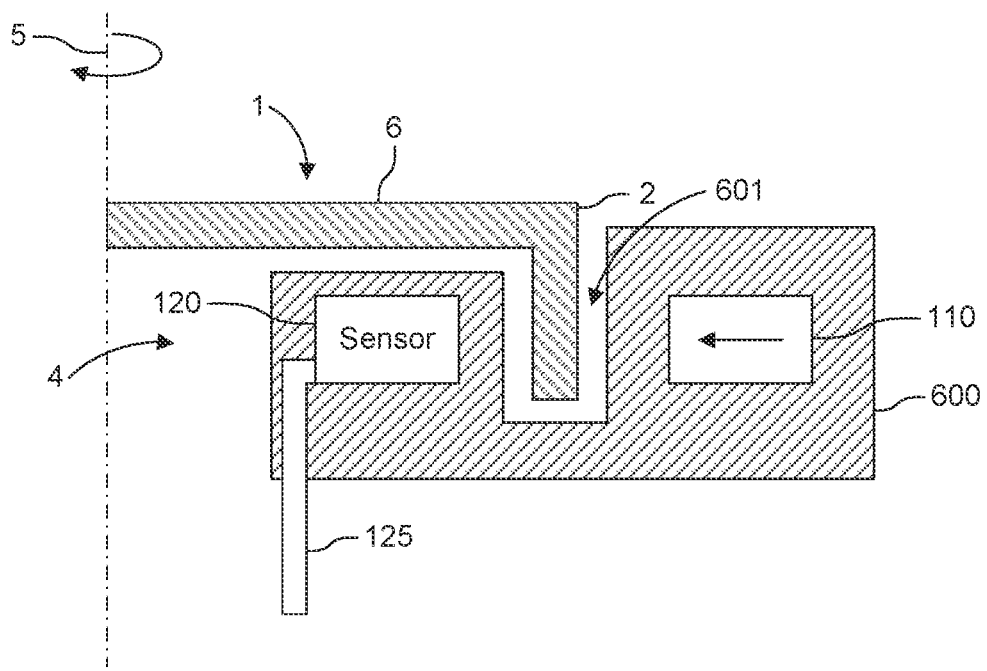

FIGS. 6A and 6B illustrate sensor packages according to one or more embodiments. In FIG. 6A, the front-bias magnet 110 is arranged inside the interior cavity 4 of the toothed wheel 1 and the magnetic sensor 120 is arranged external to the toothed wheel 1. In FIG. 6B, the magnetic sensor 120 is arranged inside the interior cavity 4 of the toothed wheel 1 and the front-bias magnet 110 is arranged external to the toothed wheel 1. The front-bias magnet 110 is magnetized with a magnetization direction that extends along a symmetry axis of the front-bias magnet 110.

In both FIGS. 6A and 6B, the front-bias magnet 110 and the magnetic sensor 120 are encapsulated by a molded package 600 (e.g., encapsulant). The molded package 600 has a one-piece integral construction that holds the symmetry axis of the magnet 110 in alignment with the sensitivity-axis of each sensor element of the magnetic sensor 120. Here, the magnetic sensor 120 includes at least one sensor element arranged on an extension of the symmetry axis that coincides with the magnetization direction of the front-bias magnet 110, where each sensor element is sensitive to a magnetic field of the front-bias magnet 110 that is aligned with the symmetry axis.

The molded package 600 has a package notch 601 formed between the front-bias magnet 110 and the magnetic sensor 120 along the extension of the symmetry axis of the front-bias magnet 110 (e.g., along an extension of the radial axis 7). The package notch 601 is formed to enable the teeth 2 of the toothed wheel 1 to pass through the package notch 601 during a rotation of the toothed wheel 1. Thus, the package notch 610 allows the toothed wheel 1 to freely rotate while maintaining the front-bias magnet 110 and the magnetic sensor 120 in their fixed positions. In this way, the magnetic sensor 120 is shielded from or exposed to the magnetic field of the magnetic 110 as the toothed wheel 1 rotates about its rotation axis 5.

In the above-described embodiments, the low magnetic field offset that can be seen by the sensor in the region of the tooth 2 of the tooth wheel 1 can also be useful for the lifetime stability and true power on feature. TPO means the sensor circuit is able to detect directly at startup the correct position of the wheel 1 (e.g., it detects whether there is a tooth or notch in front of it). This is realized by a threshold value. If the sensed field exceeds the threshold, then there is a notch. If the sensed field is smaller than the threshold, then there is a tooth. In case of magnet degradation over its lifetime (i.e., magnet loses its strength), the magnetic offset will still be at or close to zero. Thus, there is little to no impact on the performance of the sensor or its capability to detect a tooth or notch at startup despite a degradation of the magnet. Moreover, expensive zero-gauss magnets are not needed, providing a cost-effective solution. Less expensive magnetics can be used instead. Moreover, a higher air-gap capability is achieved.

While the above embodiments are described in the context of detecting a wheel or camshaft speed, the sensor may be used to detect the rotation speed of any rotating member or object that creates sinusoidal variations in a magnetic field as it rotates and that may be sensed by a sensor, including a crankshaft and transmission speed sensing. For example, a combination of a ferrous wheel and a back-bias magnet may be used to generate a time varying magnetic field.

Further, while various embodiments have been described, it will be apparent to those of ordinary skill in the art that many more embodiments and implementations are possible within the scope of the invention. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A magnetic sensor system, comprising:
    a toothed wheel configured to rotate about a rotation axis that extends in an axial direction, wherein the toothed wheel comprises a plurality of teeth and a plurality of notches arranged in an alternating tooth-notch pattern and which define a circumferential perimeter, and wherein the toothed wheel further comprises an interior cavity arranged within the circumferential perimeter;
    a front-bias magnet arranged within the interior cavity of the toothed wheel, wherein the front-bias magnet is rotationally fixed and is magnetized with a magnetization direction that extends along a radial axis of the toothed wheel, the radial axis being orthogonal to the rotation axis; and
    a magnetic sensor arranged exterior to the toothed wheel, wherein the magnetic sensor comprises a first sensor element arranged on the radial axis that coincides with the magnetization direction of the front-bias magnet and the first sensor element is sensitive to a magnetic field of the front-bias magnet that is aligned with the radial axis, and wherein a rotation of the toothed wheel causes the magnetic field to oscillate between a first extremum value and a second extremum value at a location of the first sensor element.

2. The magnetic sensor system of claim 1, wherein the toothed wheel further comprises a support structure that extends radially between the rotation axis and the plurality of teeth, and wherein each of the plurality of teeth extends from the support structure in the axial direction to define the circumferential perimeter.

3. The magnetic sensor system of claim 2, wherein the toothed wheel is a stamped wheel.

4. The magnetic sensor system of claim 1, wherein the front-bias magnet is a diametrically magnetized magnet or an axially magnetized magnet.

5. The magnetic sensor system of claim 1, wherein the radial axis that coincides with the magnetization direction of the front-bias magnet extends through an axis of symmetry of the front-bias magnet.

6. The magnetic sensor system of claim 1, wherein the front-bias magnet has an entirely solid construction.

7. The magnetic sensor system of claim 6, wherein the front-bias magnet is a block magnet, an axially magnetized cylinder magnet, or a diametrically magnetized disc magnet.

8. The magnetic sensor system of claim 1, wherein each tooth of the plurality of teeth is configured to shield the magnetic sensor from the magnetic field and each notch of the plurality of notches is configured to expose the magnetic sensor to the magnetic field.

9. The magnetic sensor system of claim 8, wherein the first sensor element is configured to generate a first sensor signal in response to sensing the magnetic field modulated by the rotation of the toothed wheel, and wherein the first sensor signal has a signal pattern representative of the alternating tooth-notch pattern.

10. The magnetic sensor system of claim 9, wherein:
    the first sensor signal has a first signal value representative of the first extremum value of the magnetic field when a center of any notch is interposed between the front-bias magnet and the first sensor element, and
    the first sensor signal has a second signal value representative of the second extremum value of the magnetic field when a center of any tooth is interposed between the front-bias magnet and the first sensor element.

11. The magnetic sensor system of claim 10, wherein the second extremum value of the magnetic field is substantially zero and an absolute value of the first extremum value is greater than an absolute value of the second extremum value.

12. The magnetic sensor system of claim 9, wherein the magnetic sensor comprises a sensor circuit configured to receive the first sensor signal and generate a pulsed output signal based on the first sensor signal crossing at least one threshold.

13. The magnetic sensor system of claim 9, wherein the magnetic sensor comprises a sensor circuit configured to receive the first sensor signal and determine whether a notch or a tooth is located between the front-bias magnet and the magnetic sensor based on the first sensor signal.

14. The magnetic sensor system of claim 1, wherein the second extremum value of the magnetic field is substantially zero and an absolute value of the first extremum value is greater than an absolute value of the second extremum value.

15. The magnetic sensor system of claim 1, wherein the magnetic sensor comprises a second sensor element arranged on the radial axis that coincides with the magnetization direction of the front-bias magnet and the second sensor element is sensitive to the magnetic field of the front-bias magnet that is aligned with the radial axis, and wherein a rotation of the toothed wheel causes the magnetic field to oscillate between a third extremum value and a fourth extremum value at a location of the second sensor element.

16. The magnetic sensor system of claim 15, wherein the first sensor element is arranged at a first distance from the front-bias magnet along the radial axis and the second sensor element is arranged at a second distance from the front-bias magnet along the radial axis that is different from the first distance.

17. The magnetic sensor system of claim 15, wherein each tooth of the plurality of teeth is configured to shield the magnetic sensor from the magnetic field and each notch of the plurality of notches is configured to expose the magnetic sensor to the magnetic field.

18. The magnetic sensor system of claim 17, wherein the first sensor element is configured to generate a first sensor signal in response to sensing the magnetic field modulated by the rotation of the toothed wheel and the second sensor element is configured to generate a second sensor signal in response to sensing the magnetic field modulated by the rotation of the toothed wheel,
   wherein the first sensor signal has a first extremum signal value representative of the first extremum value of the magnetic field when a center of any notch is interposed between the front-bias magnet and the first sensor element,
   wherein the first sensor signal has a second extremum signal value representative of the second extremum value of the magnetic field when a center of any tooth is interposed between the front-bias magnet and the first sensor element,
   wherein the second sensor signal has a third extremum signal value representative of the third extremum value of the magnetic field when a center of any notch is interposed between the front-bias magnet and the second sensor element, and
   wherein the second sensor signal has a fourth extremum signal value representative of the fourth extremum value of the magnetic field when a center of any tooth is interposed between the front-bias magnet and the second sensor element.

19. The magnetic sensor system of claim 18, wherein the second and the fourth extremum values of the magnetic field are substantially zero.

20. The magnetic sensor system of claim 18, wherein the magnetic sensor comprises a sensor circuit configured to:
   receive the first sensor signal and the second sensor signal,
   generate a differential signal based on a combination of the first sensor signal and the second sensor signal, and
   generate a pulsed output signal based on the differential signal crossing at least one threshold.

21. The magnetic sensor system of claim 20, wherein the magnetic sensor comprises a sensor circuit configured to determine whether a notch or a tooth is located between the front-bias magnet and the magnetic sensor based on at least one of the first sensor signal, the second sensor signal, or the differential signal.

22. The magnetic sensor system of claim 15, wherein the second and the fourth extremum values of the magnetic field are substantially zero.

23. The magnetic sensor system of claim 15, wherein the first sensor element has a sensitivity axis aligned with the radial axis that coincides with the magnetization direction of the front-bias magnet.

24. The magnetic sensor system of claim 15, wherein the first sensor element and the second sensor element each have a sensitivity axis aligned with the radial axis that coincides with the magnetization direction of the front-bias magnet.

25. The magnetic sensor system of claim 15, further comprising:
   a molded package that encapsulates the front-bias magnet and the magnetic sensor,
      wherein the molded package comprises a package notch formed between the front-bias magnet and the magnetic sensor along the radial axis, and
      wherein the plurality of teeth are configured to pass through the package notch during a rotation of the toothed wheel.

26. A magnetic sensor system, comprising:
   a toothed wheel configured to rotate about a rotation axis that extends in an axial direction, wherein the toothed wheel comprises a plurality of teeth and a plurality of notches arranged in an alternating tooth-notch pattern and which define a circumferential perimeter, and wherein the toothed wheel further comprises an interior cavity arranged within the circumferential perimeter;
   a front-bias magnet arranged exterior to the toothed wheel, wherein the front-bias magnet is rotationally fixed and is magnetized with a magnetization direction that extends along a radial axis of the toothed wheel, the radial axis being orthogonal to the rotation axis; and
   a magnetic sensor arranged within the interior cavity of the toothed wheel, wherein the magnetic sensor comprises a first sensor element arranged on the radial axis that coincides with the magnetization direction of the front-bias magnet and the first sensor element is sensitive to a magnetic field of the front-bias magnet that is aligned with the radial axis, and wherein a rotation of the toothed wheel causes the magnetic field to oscillate between a first extremum value and a second extremum value at a location of the first sensor element.

27. The magnetic sensor system of claim 26, wherein each tooth of the plurality of teeth is configured to shield the magnetic sensor from the magnetic field and each notch of the plurality of notches is configured to expose the magnetic sensor to the magnetic field.

28. The magnetic sensor system of claim 27, wherein:
   the first sensor element is configured to generate a first sensor signal in response to sensing the magnetic field modulated by the rotation of the toothed wheel, wherein the first sensor signal has a signal pattern representative of the alternating tooth-notch pattern,
   the first sensor signal has a first signal value representative of the first extremum value of the magnetic field when a center of any notch is interposed between the front-bias magnet and the first sensor element, and
   the first sensor signal has a second signal value representative of the second extremum value of the magnetic field when a center of any tooth is interposed between the front-bias magnet and the first sensor element.

29. The magnetic sensor system of claim 28, wherein the second extremum value of the magnetic field is substantially zero and an absolute value of the first extremum value is greater than an absolute value of the second extremum value.

30. A magnetic sensor module, comprising:
   a toothed wheel configured to rotate about a rotation axis that extends in an axial direction;
   a front-bias magnet magnetized with a magnetization direction that extends along a symmetry axis of the front-bias magnet that is orthogonal to the rotation axis;

a magnetic sensor comprising a first sensor element arranged on an extension of the symmetry axis that coincides with the magnetization direction of the front-bias magnet, wherein the first sensor element is sensitive to a magnetic field of the front-bias magnet that is aligned with the symmetry axis, and wherein a rotation of the toothed wheel causes the magnetic field to oscillate between a first extremum value and a second extremum value at a location of the first sensor element; and a molded package that encapsulates the front-bias magnet and the magnetic sensor, wherein the molded package comprises a package notch formed between the front-bias magnet and the magnetic sensor along the extension of the symmetry axis, wherein the package notch is formed to enable a plurality of teeth of the toothed wheel to pass through the package notch during a rotation of the toothed wheel.

31. The magnetic sensor module of claim 30, wherein the molded package has a one-piece integral construction.

* * * * *